United States Patent
Lounsberry (10) Patent No.: US 11,763,364 B2
(45) Date of Patent: Sep. 19, 2023

(54) BUSINESS-TO-BUSINESS MARKETPLACE

(71) Applicant: MidwayPlus, LLC, Novi, MI (US)

(72) Inventor: Brian Lounsberry, South Lyon, MI (US)

(73) Assignee: MidwayPlus, LLC, Novi, MI (US)

( * ) Notice: Subject to any disclaimer, the term of this patent is extended or adjusted under 35 U.S.C. 154(b) by 0 days.

(21) Appl. No.: 17/670,641

(22) Filed: Feb. 14, 2022

(65) Prior Publication Data

US 2023/0143723 A1    May 11, 2023

Related U.S. Application Data

(63) Continuation-in-part of application No. 17/545,267, filed on Dec. 8, 2021.

(60) Provisional application No. 63/277,216, filed on Nov. 9, 2021.

(51) Int. Cl.
| | | |
|---|---|---|
| *G06Q 30/00* | (2023.01) | |
| *G06Q 30/0601* | (2023.01) | |
| *G06Q 50/00* | (2012.01) | |

(52) U.S. Cl.
CPC ......... *G06Q 30/0609* (2013.01); *G06Q 50/01* (2013.01)

(58) Field of Classification Search
CPC ............................ G06Q 30/0609; G06Q 50/01
USPC ................................................ 705/26.1–27.2
See application file for complete search history.

(56) References Cited

U.S. PATENT DOCUMENTS

| | | | |
|---|---|---|---|
| 5,664,115 A | 9/1997 | Fraser | |
| 6,574,608 B1 | 6/2003 | Dahod et al. | |
| 7,640,186 B1 | 12/2009 | Fraser et al. | |
| 2002/0082934 A1* | 6/2002 | Koda | G06Q 10/1095 705/26.5 |
| 2004/0153414 A1* | 8/2004 | Khaishgi | G06Q 20/12 705/58 |
| 2010/0143714 A1 | 6/2010 | Chang | |
| 2010/0312615 A1 | 12/2010 | Murphy et al. | |
| 2012/0036043 A1* | 2/2012 | Koch | G06Q 30/0613 705/26.8 |

(Continued)

OTHER PUBLICATIONS

Dynojet Automotive and Powersports Dynamometers. http://dynojet.com. Recovered from archive.org from Dec. 2, 2016. (Year: 2016).*

(Continued)

*Primary Examiner* — Anand Loharikar
(74) *Attorney, Agent, or Firm* — Carlson, Gaskey & Olds, P.C.

(57) ABSTRACT

In some aspects, the techniques described herein relate to a system, including: a processor-implemented module configured to provide a business-to-business marketplace, wherein the processor-implemented module is first configured to filter potential resellers by industry type such that potential sellers are only able to conduct business on the business-to-business marketplace with potential resellers in a common industry, and wherein the processor-implemented module is second configured to allow a potential seller to filter potential resellers based one or more of (1) a plurality of predefined potential reseller verification tiers, wherein one of the potential reseller verification tiers is based on a physical inspection of the potential reseller, (2) a type of address of the potential reseller, (3) equipment of the potential reseller, or (4) a type of facility of the potential reseller.

20 Claims, 4 Drawing Sheets

(56) References Cited

U.S. PATENT DOCUMENTS

| | | | |
|---|---|---|---|
| 2014/0046780 A1* | 2/2014 | Rothman | G06Q 30/0601 705/26.41 |
| 2014/0067603 A1 | 3/2014 | Okoro et al. | |
| 2016/0239888 A1 | 8/2016 | Silver | |
| 2017/0243284 A1* | 8/2017 | Rubman | G06Q 30/08 |

OTHER PUBLICATIONS

Perez, Sarah. "To Fight Fraud, Amazon Now Screens Third-Party Sellers through Video Calls." TechCrunch, TechCrunch, Apr. 27, 2020, https://techcrunch.com/2020/04/27/to-fight-fraud-amazon-now-screens-third-party-sellers-through-video-calls/.

Morrongiello, Julia. "The B2B Marketplace Stack." Medium, Point Nine Land, Dec. 8, 2020, https://medium.com/point-nine-news/the-b2b-marketplace stack-fa5b650f09b0.

Faire. "Wholesale reinvented". faire.com. Retrieved Nov. 10, 2021, from https://www.faire.com/.

* cited by examiner

BUSINESS-TO-BUSINESS MARKETPLACE

RELATED APPLICATION(S)

This application is a continuation-in-part of prior U.S. application Ser. No. 17/545,267, filed Dec. 8, 2021, which claims the benefit of U.S. Provisional Application No. 63/277,216, filed Nov. 9, 2021. The '267 and '216 Applications are herein incorporated by reference in their entirety.

TECHNICAL FIELD

This disclosure relates to a business-to-business marketplace, and a corresponding system and method. The disclosure has particular benefits in the context of the automotive industry.

BACKGROUND

A business-to-business (B2B or, in some countries, BtoB) marketplace is a marketplace where one business makes a commercial transaction with another. A specific example of a business-to-business marketplace in the automotive industry includes a manufacturer of automotive parts selling products to potential commercial resellers, such as automotive repair shops and/or automotive parts stores, as opposed to selling directly to end consumers.

SUMMARY

In some aspects, the techniques described herein relate to a system, including: a processor-implemented module configured to provide a business-to-business marketplace, wherein the processor-implemented module is first configured to filter potential resellers by industry type such that potential sellers are only able to conduct business on the business-to-business marketplace with potential resellers in a common industry, and wherein the processor-implemented module is second configured to allow a potential seller to filter potential resellers based one or more of (1) a plurality of predefined potential reseller verification tiers, wherein one of the potential reseller verification tiers is based on a physical inspection of the potential reseller, (2) a type of address of the potential reseller, (3) equipment of the potential reseller, or (4) a type of facility of the potential reseller.

In some aspects, the techniques described herein relate to a system, wherein the processor-implemented module is configured to filter potential resellers by industry type as potential resellers enroll in the business-to-business marketplace.

In some aspects, the techniques described herein relate to a system, wherein the processor-implemented module is configured to display to the potential sellers a value indicative of a quantity of sales a potential reseller has made in a product category in a period of time.

In some aspects, the techniques described herein relate to a system, wherein the value is indicated by displaying one of a plurality of predefined badges.

In some aspects, the techniques described herein relate to a system, wherein the value is displayed as a numerical range.

In some aspects, the techniques described herein relate to a system, wherein the plurality of predefined potential reseller verification tiers includes: a first tier in which potential resellers are verified to be a business with an employer identification number, a second tier in which an attribute of the potential resellers is virtually confirmed, and a third tier in which an attribute of the potential resellers is confirmed based on a physical inspection conducted by a representative of an operator of the business-to-business marketplace.

In some aspects, the techniques described herein relate to a system, wherein the processor-implemented module is configured to assign a first tier verification only to potential resellers with an employer identification number.

In some aspects, the techniques described herein relate to a system, wherein the processor-implemented module is configured to assign the second tier verification when the potential resellers self-report an attribute and the self-reported attribute is conceivable based on publicly-available information about the potential resellers.

In some aspects, the techniques described herein relate to a system, wherein the potential seller is able to filter potential resellers based on whether an address of the potential reseller is a residential address.

In some aspects, the techniques described herein relate to a system, wherein the potential seller is able to filter potential resellers based a behavior history of the potential resellers.

In some aspects, the techniques described herein relate to a system, wherein the behavior history includes historical information pertaining to a frequency.

In some aspects, the techniques described herein relate to a system, wherein: the processor-implemented module is configured to present an interface to potential resellers, the interface includes a first section and a second section adjacent the first section, within the first section, potential resellers are able to view a plurality of listings and shop for goods from the potential sellers, and within the second section, potential resellers are presented with advertisements from the potential sellers.

In some aspects, the techniques described herein relate to a system, wherein the second section includes a scrollable feed of advertisements.

In some aspects, the techniques described herein relate to a system, wherein the processor-implemented module is embodied on a computing device.

In some aspects, the techniques described herein relate to a system, wherein the processor-implemented module is embodied on a server and is accessible by other computing devices using a network.

In some aspects, the techniques described herein relate to a method, including: filtering potential resellers as the potential resellers enroll in a business-to-business marketplace such that the potential resellers are only able to do business with potential sellers in a common industry; and filtering the potential resellers within the business-to-business marketplace based one or more of (1) a plurality of predefined potential reseller verification tiers, wherein one of the potential reseller verification tiers is based on a physical inspection of the potential reseller, (2) a type of address of the potential reseller, (3) equipment of the potential reseller, or (4) a type of facility of the potential reseller.

In some aspects, the techniques described herein relate to a method, further including: displaying to the potential sellers a value indicative of a quantity of sales a potential reseller has made in a product category in a period of time.

In some aspects, the techniques described herein relate to a method, wherein the value is indicated by displaying one of a plurality of predefined badges.

In some aspects, the techniques described herein relate to a method, wherein the plurality of predefined potential reseller verification tiers includes: a first tier in which potential resellers are verified to be a business with an employer identification number, a second tier in which an attribute of the potential resellers is virtually confirmed, and a third tier in which an attribute the potential resellers are physically inspected by a representative of an operator of the business-to-business marketplace.

In some aspects, the techniques described herein relate to a method, further including: presenting an interface to the potential resellers, wherein the interface includes a first section and a second section adjacent the first section, wherein, within the first section, potential resellers are able to shop for goods from potential sellers, and wherein, within the second section, potential resellers are presented with advertisements from the potential sellers.

DETAILED DESCRIPTION

This disclosure relates to a business-to-business marketplace, which is embodied on one or more processor-implemented modules and an online platform, and a corresponding system and method. The system may include one or more computing devices, including servers, providing the processor-implemented module(s) configured to run and host the platform. Users, such as potential sellers and potential resellers, can access the platform online and engage in commercial transactions with one another using a computing device, such as a mobile device or a computer. The platform is accessible via a network, namely the Internet.

This disclosure uses the term "potential" as in "potential seller" and "potential reseller" to denote that the two parties have not necessarily engaged in a commercial transaction, but may do so in the near or immediate future. Once a transaction occurs, the potential seller would be considered a seller, and the potential reseller would be considered both a buyer and a reseller, from the perspective of the seller. The term reseller refers to a company or person who buys goods with the intent to resell them as opposed to use them. A reseller is not an end user in this disclosure. Potential sellers may be referred to as sellers, and potential resellers may be referred to as resellers or buyers, without departing from the scope of this disclosure.

In one aspect of this disclosure, the potential seller could be the operator of the business-to-business marketplace. In this example, the potential seller could be considered a wholesaler. Further, in this example, the potential seller may be the only seller on the business-to-business marketplace. In another example, the business-to-business marketplace could be operated by a third party, such as MidwayPlus, that is not a potential seller. In this example, the business-to-business marketplace is not limited to a single potential seller.

Figure 1:
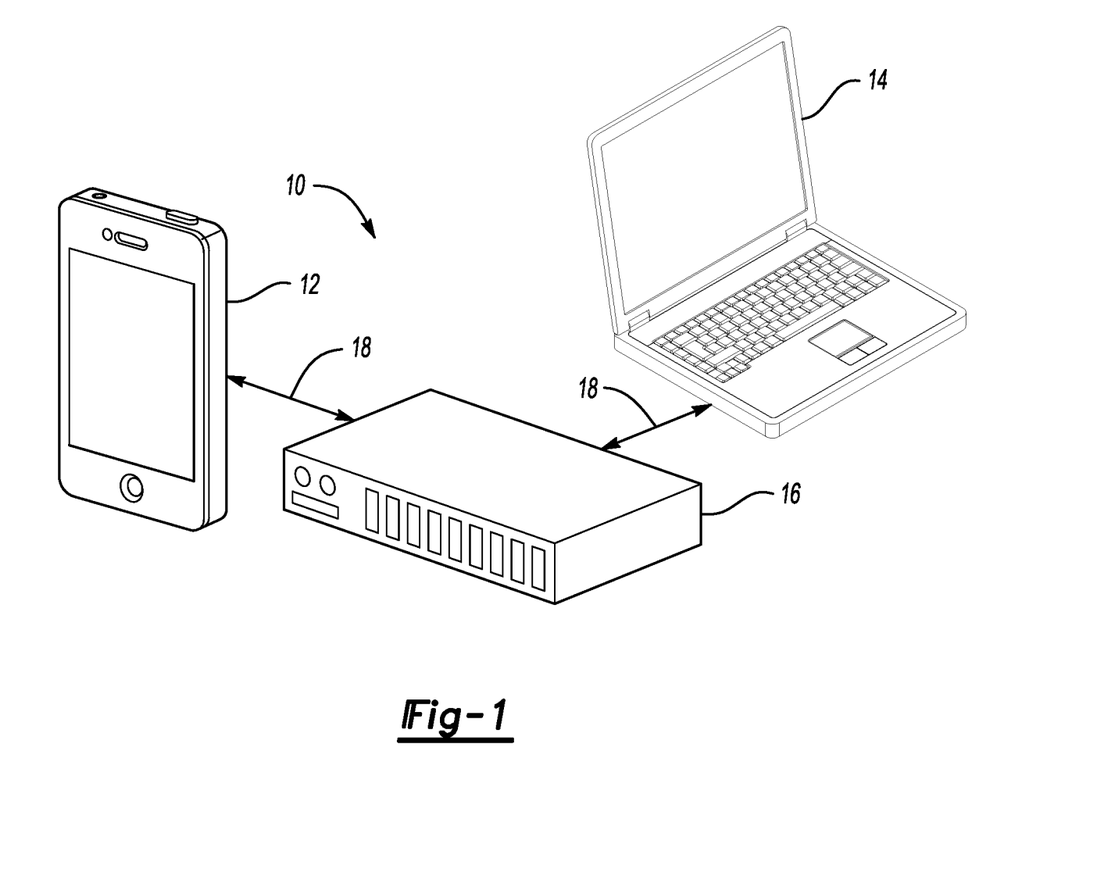
FIG. 1 is a highly schematic view of an example system according to this disclosure.

FIG. 1 is a highly schematic view of an example system 10 which embodies a business-to-business marketplace. In this example, the system 10 includes a first computing device 12, a second computing device 14, and a third computing device 16. As shown in FIG. 1, the first computing device 12 is a mobile computing device, such as a tablet or a smartphone. The second computing device 14 is a laptop or desktop computer, and the third computing device 16 is a computing device including a server. Relative to the third computing device 16 in particular, while shown as a single server, the third computing device 16 can be implemented using multiple components at various locations. The first, second, and third computing devices 12, 14, 16 are illustrated for purposes of explanation, and should not be considered as limiting regarding the type or number of computing devices used with the disclosed system 10.

In this example, the first, second, and third computing devices 12, 14, 16 are in communication with one other as schematically shown via connections 18, which include wireless links and/or hard-wired connections, such as those used in networks and/or to access the Internet. Each of the first, second, and third computing devices 12, 14, 16 may include memory, hardware, and software, and be configured to communicate with one another and transmit data between one another. The first, second, and third computing devices 12, 14, 16 may further be configured to store information and data, and send and receive instructions to one another to execute the methodology and techniques described below.

In general, a first aspect of this disclosure gives potential sellers the ability to limit the visibility of their product listings to a certain subset of potential resellers by filtering out potential resellers that do not meet the criteria set by the potential sellers. Another aspect of this disclosure targets advertisements of the potential sellers such that the advertisements are limited in visibility to only those potential resellers that meet the criteria set by the potential seller. Permitting potential sellers to filter out certain potential resellers, both for purposes of selling and advertising, is especially important in certain industries, such as the automotive industry, in which the potential reseller is often required to install a purchased item and the quality of the installation is perceived by an end user as a quality of the product. In turn, the quality of the installation reflects upon the seller in the mind of the end user, despite the seller not performing the installation. As such, this disclosure provides potential sellers with the ability to sell and advertise products only those potential resellers that have certain characteristics or attributes. Further, this disclosure assigns a level of certainty associated with the reported characteristics or attributes of the potential resellers, which in turn permits the potential sellers to evaluate the importance of a potential reseller exhibiting that characteristic. For at least these reasons, this disclosure increases the efficiency and ease of use of a user interface.

In an aspect of this disclosure, the business-to-business marketplace includes vetted potential resellers (e.g., automotive repair shops, automotive parts stores). In one example, potential resellers are vetted according to a three-tier verification system. In a first tier, the potential reseller is verified to be a business with an employer identification number (EIN). In a second tier, the potential reseller is virtually confirmed to have certain attributes, such as the ability to perform certain tasks and have certain equipment. In an example of the second tier, the potential reseller self-reports certain attributes, such as self-reporting that the potential reseller can perform repairs and installations, and such as self-reporting that the potential reseller has three garage bays. In a particular aspect of the second tier, the potential reseller may self-report that it has a particular number of mechanics on staff, each with particular specializations (e.g., diagnostic technician, transmission technician, brake technician, etc.), and each having particular certifications, degrees, or other qualifications. An example certification may be an automotive service excellence (ASE) certification. A third tier involves inspection of the potential reseller's facilities and/or personnel records by a representative of the host or operator of the business-to-business marketplace platform, such as an employee or contractor of MidwayPlus, to determine the type of facilities and equipment available at the potential reseller. While a three-tier verification system is described herein, there could be a different number of tiers in some embodiments.

In general, in an aspect of this disclosure, the potential resellers are assigned an overall verification tier. When this verification is assigned, the potential reseller is deemed to have all attributes listed as being associated with that potential reseller at a confidence level associated with the tier of the particular potential reseller. Potential sellers can use the verification level to determine, with a corresponding degree of confidence, whether the potential resellers exhibit certain attributes.

In another aspect of the disclosure, a particular potential reseller could have some attributes with different verification tiers. For instance, a potential reseller could have a third tier verification, and then the potential reseller could add new equipment and self-report that equipment. In such a case, the potential reseller would retain a third tier verification associated with the previously verified attributes, but have a second tier verification for the newly self-reported equipment. A physical inspection could raise the second tier equipment to a third tier verification.

With respect to the first tier, the EIN would be verified to have a legitimate presence in a particular industry. In the example where the business-to-business marketplace is targeted at the automotive industry, if the EIN is associated with an industry other than the automotive industry, the potential reseller would not receive a first tier verification. The system of this disclosure is configured to compare the EIN with public records to determine whether the EIN has a legitimate presence in a particular industry.

With respect to the second tier, the host of the platform may virtually verify that there is a building that looks like it could conceivably have a particular self-reported attribute, such as the number of bays in a garage. The verification may be done using, for example, Google Earth or another type of web mapping platform. In a specific example, the verification is done using a street view of the facility of the potential reseller. If, based on a street view of an address, a garage is relatively large and includes at least three doors, then a self-reported feature of a three-bay garage would be considered conceivable and the potential reseller would receive the second tier verification. If, on the other hand, the address was a residence with one garage door, the second tier verification would not be considered conceivable and be denied. The confirmation may also be done by comparing the self-reported quantity of mechanics, and their qualifications, with publicly-available records such as LinkedIn, directories, listings published by licensing bodies, etc. Once confirmed, a particular attribute will be assigned a second tier verification. In another aspect, a second tier verification is not confirmed, and is instead based on self-reporting of the potential reseller alone.

With respect to the third tier, the representative of the host may verify certain attributes, such as number of bays and diagnostic equipment available, at a particular potential reseller's facility. In a particular aspect of this disclosure, attributes of the potential resellers only receive third tier verification when the attributes are confirmed by the representative of the host. In one aspect, confirming the attributes of the potential resellers includes having the representative enter the attribute into the processor-implemented module, in the first instance, upon the representative being satisfied that the attribute exists following an inspection. In another aspect, confirming the attributes of the potential resellers includes having the representative provide an input, into the processor-implemented module, indicating an agreement that the self-reported attribute of the potential reseller is present, upon the representative being satisfied that the attribute exists following an inspection. In other words, the representative can provide inputs that confirm certain self-reported attributes are present, raising those attributes from a second tier verification to a third tier verification.

In one exemplary aspect of this disclosure, the third tier verification may include an optional sub-verification, which may be referred to as a "pro" verification. With a "pro" verification, the potential reseller has been verified to have an expertise in installing a certain product. The "pro" verification may be product-specific, and in an example is stock keeping unit (SKU) specific. One example may include electronic control units (ECUs) for race cars. Such products require specialized installation. A potential reseller familiar with installation of an ECU for a Porsche may not necessarily be familiar with installation of an ECU for a Lamborghini, and vice versa. As such, a SKU-specific, "pro" verification may be assigned only to the SKU associated with the particular ECU that the potential reseller has experience installing. While race car ECUs are mentioned as an example, the "pro" verification can extend to any potential resellers who have been verified as having expertise with installation of a certain product.

In another aspect, using the platform, potential sellers (e.g., manufacturers or brands) have ability to filter potential resellers using addresses type (i.e., it's a residential address or a commercial address), equipment type, or facility features.

Within the platform, in addition to seeing the potential resellers' verification status, the platform permits potential sellers to filter businesses operating out of a residence (i.e., filter by address type). The platform also permits brands to sort potential resellers by their equipment and facilities.

Further, as one option, potential sellers may be able to block potential resellers for various reasons, including if the potential resellers violate a seller's pricing policy such as a minimum advertised price, have high returns, etc.

The potential sellers have full control over which potential resellers to sell to in the marketplace. Depending on the filter set by the potential sellers when creating a product listing, the platform is able to limit the visibility of that product listing to only those potential resellers that meet the criteria set by the seller. Specifically, potential sellers can choose to allow their product to be sold to any verified potential reseller and then selectively block specific potential resellers or choose to sell to no one by default and then authorize specific potential resellers to buy their products.

In one example, all potential resellers will be verified, according to one of the three tiers described above, by the host of the platform, such as MidwayPlus.

In another aspect, potential sellers can use attributes of the potential reseller to determine if they want to sell to that potential reseller or group of potential resellers. For instance, potential sellers can choose to sell to any potential reseller other than those potential resellers whose business address is a residence. This will filter out potential resellers who work out of their home, which is a common occurrence in the automotive parts industry and which may indicate, from the perspective of some suppliers, a low level of confidence that the potential reseller is suited to install certain pieces of automotive equipment. Alternatively or in addition, potential sellers could choose to sell to potential resellers with garages with certain technicians possessing certain levels of training, and/or potential sellers can select potential resellers based on the specific diagnostic equipment within that potential reseller's garage. Potential sellers could choose to believe certain self-reported attributes about a potential reseller or require that those attributes have been verified by a host of the platform.

In another aspect, potential sellers may be able to use the behavior history of potential resellers to choose to sell to them or not. The behavior history may include historical information of interest to potential sellers regarding the frequency of certain occurrences associated with a particular potential reseller. Specifically, in one possible example, if a potential reseller is found to violate a potential seller's minimum advertised pricing policy, for example, that particular potential reseller could be blocked by that potential seller. A potential reseller who has a high rate of product returns or warranty claims could be blocked from buying from the potential seller. A potential seller could choose to sell to only those potential resellers who have a MidwayPlus site-wide return rate of less than 1%, for example.

Potential sellers want the choice of who they sell to, service, support, and allow to list the products they make. Specifically, if an automotive part is not installed properly, the blame should lie with the installer (reseller), but instead end users often improperly blame the manufacturer (seller). This disclosure permits potential sellers to sell only to vetted potential resellers, which in turn reduces the likelihood that a particular automotive part will be installed improperly. Again, many of automotive products are not easy to install and some potential sellers want to sell only to qualified potential resellers. In turn, this disclosure helps potential sellers protect their brand, namely the consumer confidence of their brand.

Another aspect of this disclosure relates to data. The marketplace permits potential sellers and potential resellers to view and access data associated with the type and quantity of goods being sold on the marketplace. The data may include trends over time. The data may, for example, be broken out into product category. For instance, the data trend may indicate that muffler sales have increased by 10% over the past month, or that catalytic converter sales have decreased by 50% over the past year. The potential sellers and potential resellers on the platform can use such data to inform future business decisions. The data and trends are based on actual sales made using the platform, and are thus reliable and verified. This is in stark contrast to other types of automotive industry data, which is typically self-reported, and, as such, is unverified.

A further aspect of this disclosure relates to advertising on the platform and in particular to a feed including various advertisements and/or other news or information. The marketplace may permit potential sellers to create profiles and create posts within this feed. Those posts are visible by other users of the marketplace. The posts may be targeted at a particular subset of potential resellers. In a particular aspect, the posts are targeted at potential resellers according to their verification tier, such as one of the three verification tiers discussed above. The potential seller may advertise only to potential resellers with certain facilities and/or qualifications, and a corresponding verification status. For instance, a potential seller may only desire to advertise to potential resellers with an ASE certified mechanic on staff and third tier verification. In another example, the advertisements are limited in visibility to a selected verification status of the potential resellers, or to potential resellers that exceed the selected verification status. For instance, if a potential seller set a particular advertisement as being visible to potential resellers with a second tier verification, that particular advertisement would also be visible to potential resellers with a third tier verification. In another example, the potential seller has to select each verification status independently and the processor-implemented module will not assume that an advertisement intended for second tier verified potential resellers is also suitable for third tier verified potential resellers. The posts in the news feed may feature products and may include links to a page where the product may be purchased by a potential reseller. Potential resellers that view the posts can click links in the posts and be directed to the product page and make a purchase.

Figure 2:
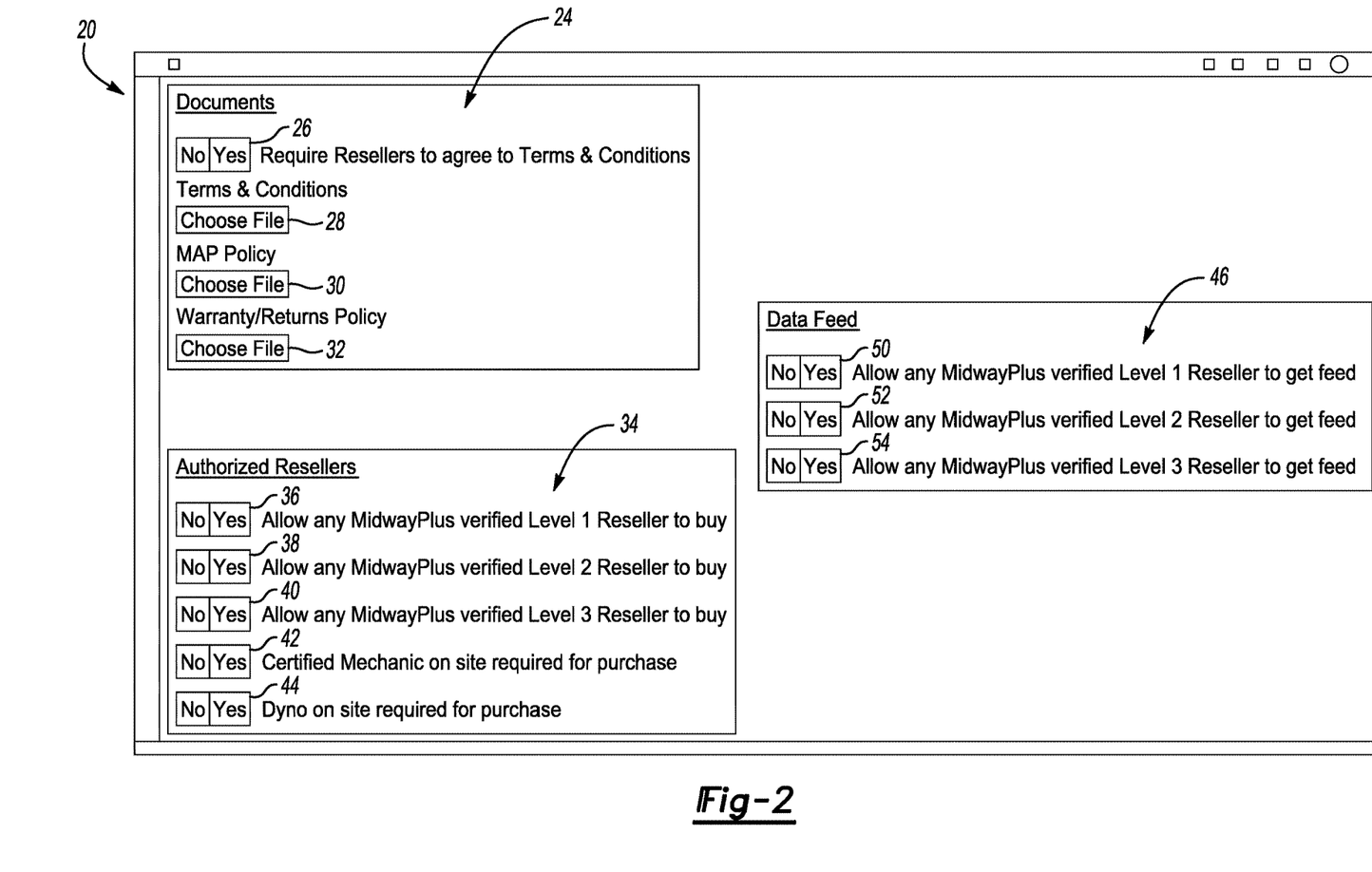
FIG. 2 is an example user interface of a potential seller.
Figure 3:
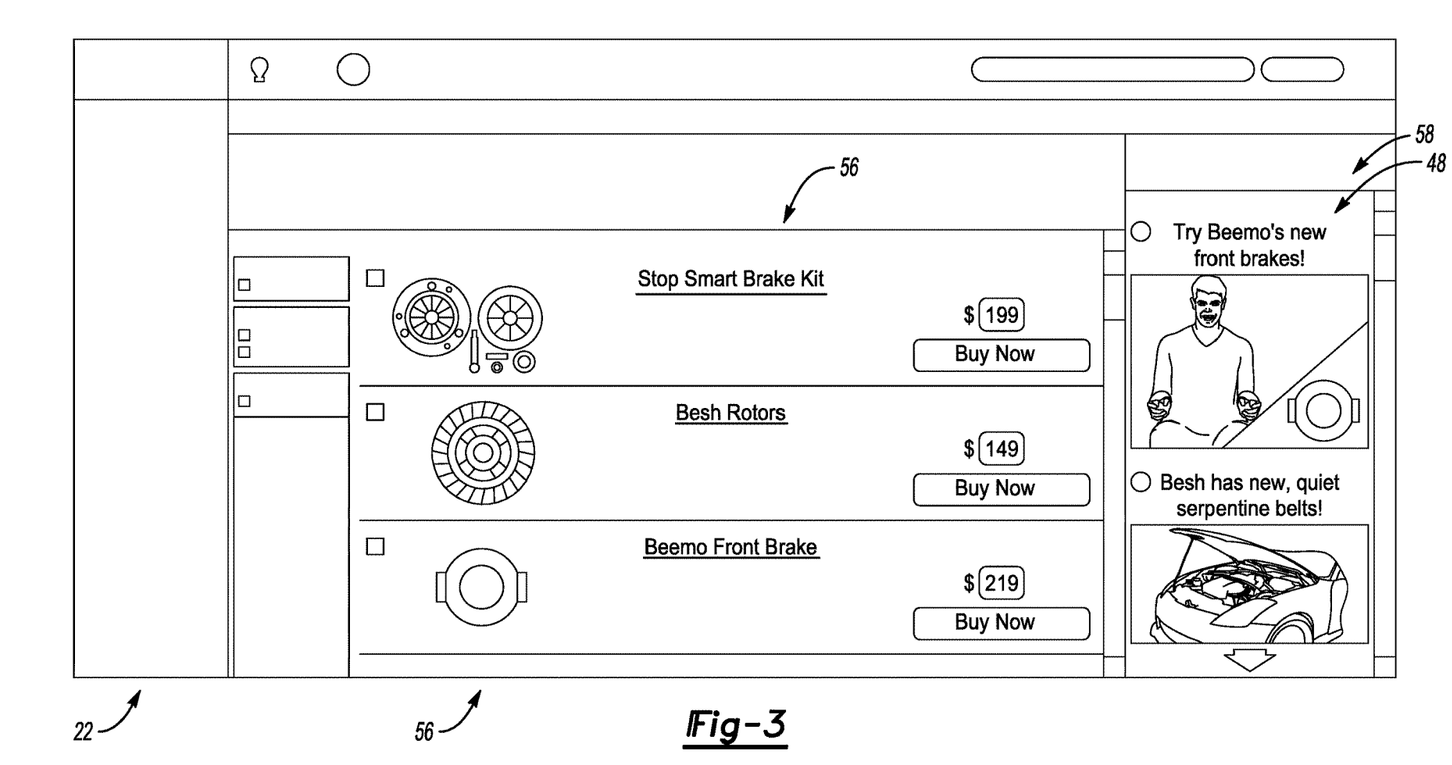
FIG. 3 is an example user interface of a potential reseller.

A particular example of this disclosure will be described in more detail with respect to FIGS. 2 and 3. FIG. 2 is an example user interface 20 of a potential seller. FIG. 3 is an example user interface 22 of a potential reseller. The interfaces of FIGS. 2 and 3 are presented to the potential sellers and potential resellers, respectively, via computing devices such as the computing devices 12, 14 discussed above.

The interface 20 of FIG. 2 is used by a potential seller when publishing a listing and/or advertisement on the business-to-business marketplace. Among other information, such as product description and images, the interface 20 includes a plurality of input fields required to be filled out by the potential seller. While a particular arrangement of fields are disclosed, this disclosure is not limited to the fields specifically shown in FIG. 2. Further, while the fields have various selectors, such as buttons, drop-downs, etc., this disclosure extends to various other types or quantities of selectors.

A first field 24 relates to documents that may be associated with the listing. A first selector 26, which here is a radio button with "No" and "Yes" options, permits the potential seller to select whether a user (potential reseller) must agree to terms and conditions when purchasing the item from the listing. If "Yes" is selected at first selector 26, the potential seller uploads one or more documents, which may relate to terms and conditions, a minimum advertised pricing policy, and/or a warranty/return policy using upload fields 28, 30, 32, respectively.

A second field 34 relates to filtering of potential resellers. Within the second field, the potential seller can select one or more of the first, second, and third selectors 36, 38, 40, which are radio buttons having "No" and "Yes" options and which correspond to first, second, and third verification tiers discussed above, respectively. If, for example, the potential seller inputs a "Yes" into the first selector 36, the listing will be visible by potential resellers with a first tier verification.

The second field 34 also includes a selector 42 corresponding to whether a certified mechanic is available on-site at the potential reseller, and further includes a selector 44 corresponding to whether a dynamometer is on-site at the potential reseller. Additional or alternative questions, and corresponding selectors, may be included in the second field 34. For instance, a question for "Exclude resellers using a residential address" and a corresponding "Yes"/"No" radio button may be present.

In one aspect of this disclosure, if the user inputs a "Yes" into selector 36, the system will automatically input a "Yes" into selectors 38, 40. In other words, the system will assume that a product listing suitable for potential resellers with only a first tier verification will also be suitable for potential resellers with a greater degree of verification. A potential seller can override the automatic selection. In another aspect of this disclosure, the system will require manual inputs for each selector 36, 38, 40, and will not automatically assume that a product suitable to sell to a potential reseller of one level of verification will also be suitable for sale to potential resellers of another verification level.

Field 46 permits the potential seller to select whether the listing should appear in an advertising feed 48 (FIG. 3) of the potential resellers and, if so, to which potential resellers. Within the field 46, the potential seller can select one or more of the first, second, and third selectors 50, 52, 54, which are radio buttons having "No" and "Yes" options and which correspond to first, second, and third verification tiers, respectively. If, for example, the potential seller inputs a "Yes" into the first selector 50, for example, the listing will be visible in the advertising feed 48 by potential resellers with a first tier verification. If "Yes" is selected in any of the selectors 50, 52, 54, the processor-implemented module may automatically generate a post for publication in the news feed and/or require a seller to create a post for publication by presenting the seller with various prompts and/or input fields.

The interface 20 could include additional fields and selectors, including those associated with freight, shipping, fulfillment, banner ads, etc. The potential seller can revisit the interface 20 after publishing the listing and update the settings, if needed.

Interface 22 includes a first section 56 and a second section 58. In this example, the first section 56 is a majority of the interface 22 by surface area. The first section 56 is scrollable and includes listings of various products available for purchase to the potential reseller. A potential reseller will only be able to view a listing via the interface 22 if the potential reseller meets the criteria that the potential seller has set for a particular listing. In another example, the potential reseller is able to view the listing, but if the potential reseller does not meet the criteria the potential reseller cannot interact with the listing in the same manner as potential resellers that meet the criteria. Namely, the unqualified potential reseller will not be able to see price, inventory level, or add the product to their cart, as examples.

The second section 58 includes the advertising feed 48. The second section 58 is narrower than the first section 56 and includes a scrollable feed with distinct posts including advertisements and/or other information in the form of vertically-stacked posts, with each post vertically on top of another. Each post may be made by a unique seller and may relate to a unique product. The posts may include a link to a particular seller's landing page within the business-to-business marketplace, and/or may include a link to a product listing associated with the post. A potential reseller can click a link in the second section 58 and be directed to a particular product listing in the first section 56 without refreshing the entirety of the page. In other words, the first section 56 can update based on the interaction of the potential reseller with the second section 58 without the second section 58 being updated. Potential resellers of different verification tiers will have unique advertising feeds 48, meaning each potential reseller will only be able to view a post via the advertising feed 48 if the potential reseller meets the criteria that the potential seller has set for a particular listing.

Figure 4:
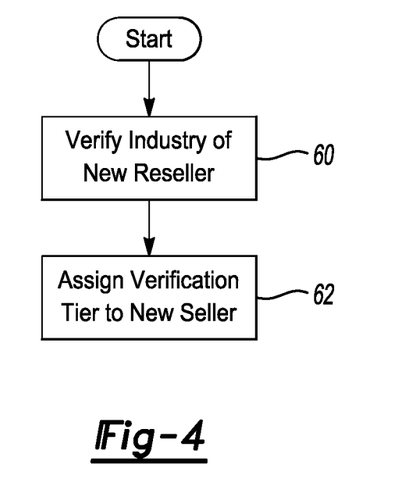
FIG. 4 is a flow chart representative of an example aspect of this disclosure.

In a further aspect of this disclosure, as represented by FIG. 4, potential resellers are verified to operate in certain industries as the potential resellers enroll in the business-to-business marketplace, at 60. The industry of the potential resellers may first be indicated by the potential resellers in an enrollment process, and is verified either by an individual or by a computing device associated with the business-to-business marketplace. The industry may be verified if the potential reseller is known to sell goods in that industry, using available information, such as non-public information from sellers that are enrolled in the business-to-business marketplace, or other information, such as public information.

Once an industry of the potential resellers is verified, the potential resellers will only be able to conduct business on the business-to-business marketplace with potential sellers of a common industry. Filtering the potential resellers in this manner reduces the likelihood a potential reseller is operating outside their area of expertise. For instance, a potential reseller of brakes for heavy machinery, such as backhoes and dump trucks, may not be a good fit to conduct business with a potential seller looking to sell brakes for high end performance racing vehicles. After the potential resellers are enrolled and verified as operating in a particular industry, the potential resellers are then further verified according to the three-tiered verification system discussed above, at 62.

Figure 5:
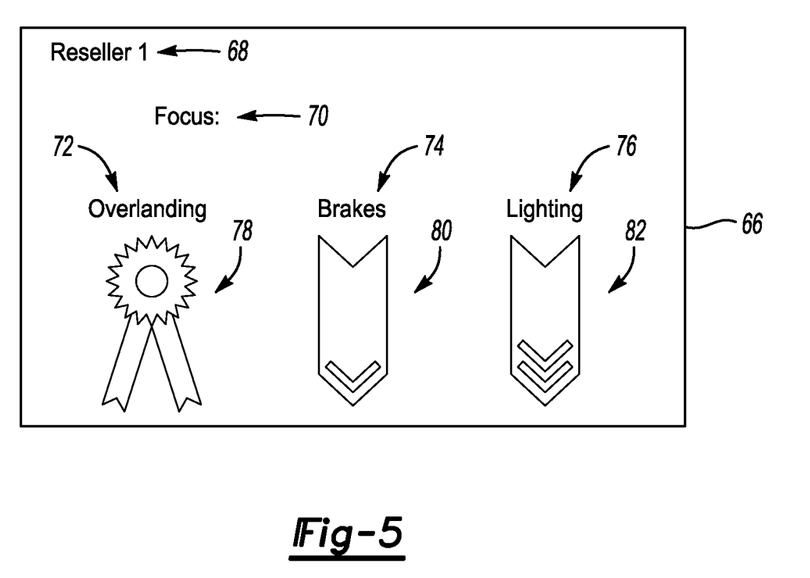
FIG. 5 is another example user interface of a potential seller.

FIG. 5 is representative of another aspect of this disclosure, in which potential sellers can view sales history information about a potential reseller. Specifically, FIG. 5 illustrates an example user interface 66 of a potential seller, which is presented to the potential sellers via one of the computing devices. The interface 66, in this example, includes a field 68 for a potential reseller's name, and a field 70 referred to as the "focus" of that potential reseller. The field 70 signifies to the potential seller the types and quantities of products the potential reseller sells. Field 70 could have a name other than "focus."

For instance, in the example of FIG. 5, there are three product category fields 72, 74, 76 and corresponding badges 78, 80, 82 within the field 70. The badges 78, 80, 82 are arranged adjacent, here below, a corresponding product category field 72, 74, 76. The badges 78, 80, 82 represent the quantity of sales the potential reseller has made in each corresponding product category using the business-to-business marketplace in a period of time. The period of time may be the entirety of time the potential reseller has been active on the business-to-business marketplace, a trailing twelve months, a year to date, or another period of time. The scale associated with the badges 78, 80, 82 is set by the business-to-business marketplace. In an example, the badge 78 may indicate over $1,000,000 in sales in the product category corresponding to overlanding, in this example, during the period of time. The badge 80, which includes only one chevron, may indicate sales in the product category of brakes between $0 and $500,000, while the badge 82, which includes two chevrons, may indicate sales in the product category of lighting between $500,001 and $999,999. While chevrons are shown, different icons or indicators can be used. This disclosure is not limited to the illustrated badge convention. Further, as an alternative to badges, a numerical range may be displayed.

Another aspect of this disclosure relates to collection of data and displaying various trends. In an example, the business-to-business marketplace may display to some or all users a sales trend indicative of the quantity of sales within a certain product category. For instance, the trend may indicate that brake sales activity has increased or decreased over a certain period of time. The trend may alternatively or additionally indicate whether an average price of products within a certain product category have increased or decreased over a certain period of time. The trend may alternatively or additionally indicate whether keyword searches for certain products on the business-to-business marketplace have increased or decreased over a certain period of time. The trends present the data in an anonymized and aggregated manner.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A system, comprising:
    a first computing device including an interface;
    a processor-implemented module embodied on a second computing device and configured to provide a business-to-business marketplace, wherein the business-to-business marketplace permits a potential seller to sell goods to potential resellers, wherein the potential seller is able to use the first computing device to access the business-to-business marketplace via a network,
    wherein the interface of the first computing device is configured to permit the potential seller to create a listing to sell a product on the business-to-business marketplace, wherein, when creating the listing, the interface of the first computing device permits the potential seller to set criteria including (i) a first criterion for installation or testing equipment of the potential resellers and (ii) a second criterion for a verification tier of the potential resellers, wherein the verification tier corresponds to a degree of confidence of whether the potential resellers exhibit the first criterion, and
    wherein, after the listing is published on the business-to-business marketplace, the processor-implemented module is configured to display the listing to potential resellers via computing devices and corresponding interfaces of the potential resellers,
    wherein, after the listing is published on the business-to-business marketplace, the processor-implemented module is configured such that only potential resellers that meet the first criterion and the second criterion are able to purchase the product via the business-to-business marketplace.

2. The system as recited in claim 1, wherein, as potential resellers enroll in the business-to-business marketplace, an industry type of the potential reseller is determined, and the processor-implemented module is configured such that only potential resellers having a common industry with the potential seller are able to purchase the product via business-to-business marketplace.

3. The system as recited in claim 1, wherein the processor-implemented module is configured to display to the potential sellers a value indicative of a quantity of sales a potential reseller has made in a product category in a period of time.

4. The system as recited in claim 3, wherein the value is indicated by displaying one of a plurality of predefined badges.

5. The system as recited in claim 3, wherein the value is displayed as a numerical range.

6. The system as recited in claim 1, wherein the verification tier includes one of a plurality of predefined potential reseller verification tiers, and wherein the predefined potential reseller verification tiers includes:
    a first tier in which potential resellers are verified to be a business with an employer identification number,
    a second tier in which the equipment of the potential resellers is virtually confirmed, and
    a third tier in which the equipment of the potential resellers is confirmed based on a physical inspection conducted by a representative of an operator of the business-to-business marketplace.

7. The system as recited in claim 6, wherein the processor-implemented module is configured to assign a first tier verification only to potential resellers with an employer identification number.

8. The system as recited in claim 6, wherein the processor-implemented module is configured to assign the second tier verification when the potential resellers self-report the equipment of the potential resellers, and the self-reported equipment is conceivable based on publicly-available information about the potential resellers.

9. The system as recited in claim 1, wherein the potential seller is able to filter potential resellers based on whether an address of the potential reseller is a residential address.

10. The system as recited in claim 1, wherein the potential seller is able to filter potential resellers based a behavior history of the potential resellers.

11. The system as recited in claim 10, wherein the behavior history includes historical information pertaining to a frequency of one or more of returns, minimum advertised pricing violations, and warranty claims.

12. The system as recited in claim 1, wherein:
    the interface of the potential resellers includes a first section and a second section adjacent the first section,
    within the first section, potential resellers are able to view a plurality of listings and shop for goods from the potential sellers, and
    within the second section, potential resellers are presented with advertisements from the potential sellers.

13. The system as recited in claim 12, wherein the second section includes a scrollable feed of advertisements.

14. The system as recited in claim 1, wherein the processor-implemented module is embodied on a server and is accessible by other computing devices using a network.

15. The system as recited in claim 6, wherein the third tier includes a sub-verification in which the potential reseller has been verified as having expertise in installing a product.

16. The system as recited in claim 15, wherein the product is specific to a particular stock keeping unit (SKU).

17. The system as recited in claim 16, wherein the product is an automotive part.

18. The system as recited in claim 1, wherein the installation or testing equipment includes diagnostic equipment.

19. The system as recited in claim 1, wherein the installation or testing equipment includes equipment configured to install or test automotive parts.

20. The system as recited in claim 19, wherein the installation or testing equipment includes a dynamometer.

\* \* \* \* \*